(12) United States Patent
Wang

(10) Patent No.: US 10,717,048 B1
(45) Date of Patent: Jul. 21, 2020

(54) ENVIRONMENTAL WATER SYSTEM

(71) Applicant: Hsiang-Shih Wang, Changhua (TW)

(72) Inventor: Hsiang-Shih Wang, Changhua (TW)

( * ) Notice: Subject to any disclaimer, the term of this patent is extended or adjusted under 35 U.S.C. 154(b) by 0 days.

(21) Appl. No.: 16/408,338

(22) Filed: May 9, 2019

(51) Int. Cl.
| | |
|---|---|
| *B01D 61/58* | (2006.01) |
| *B01D 61/08* | (2006.01) |
| *B01D 61/14* | (2006.01) |
| *B01D 61/18* | (2006.01) |
| *C02F 1/44* | (2006.01) |
| *B01F 3/08* | (2006.01) |
| *B01F 5/04* | (2006.01) |
| *B01F 15/00* | (2006.01) |
| *B01D 61/02* | (2006.01) |
| *C02F 101/20* | (2006.01) |
| *C02F 101/30* | (2006.01) |

(52) U.S. Cl.
CPC .......... *B01D 61/58* (2013.01); *B01D 61/025* (2013.01); *B01D 61/08* (2013.01); *B01D 61/145* (2013.01); *B01D 61/18* (2013.01); *B01F 3/0865* (2013.01); *B01F 5/0413* (2013.01); *B01F 15/0022* (2013.01); *C02F 1/441* (2013.01); *C02F 1/444* (2013.01); *B01D 2311/06* (2013.01); *B01D 2311/08* (2013.01); *B01D 2311/246* (2013.01); *B01D 2313/50* (2013.01); *B01D 2317/025* (2013.01); *B01F 2215/0052* (2013.01); *C02F 2101/203* (2013.01); *C02F 2101/30* (2013.01); *C02F 2209/10* (2013.01)

(58) Field of Classification Search
CPC ...... B01D 61/58; B01D 61/025; B01D 61/08; B01D 61/145; B01D 61/18; B01D 2311/06; B01D 2311/08; B01D 2311/246; B01D 2313/50; B01D 2317/025; B01F 3/0865; B01F 5/0413; B01F 15/0022; B01F 2215/0052; C02F 1/441; C02F 1/444; C02F 2101/203; C02F 2101/30; C02F 2209/10
See application file for complete search history.

(56) References Cited

U.S. PATENT DOCUMENTS

| | | | | |
|---|---|---|---|---|
| 9,492,790 | B2 * | 11/2016 | Williams | B01D 61/022 |
| 10,252,932 | B2 * | 4/2019 | Valiani | B26D 1/16 |
| 10,392,265 | B2 * | 8/2019 | Yang | C02F 1/008 |
| 2013/0001163 | A1 * | 1/2013 | Taniguchi | B01D 61/025 |
| | | | | 210/637 |
| 2016/0130155 | A1 * | 5/2016 | Isogami | C02F 9/00 |
| | | | | 137/88 |

* cited by examiner

*Primary Examiner* — Terry K Cecil
(74) *Attorney, Agent, or Firm* — Che-Yang Chen; Law Office of Michael Chen

(57) ABSTRACT

An environmental water system may include an ultrafiltration membrane, a reserves osmosis (RO) system, a waste water tank, a mixer, a total dissolved solids (TDS) controller valve, a connector, and a water tap. The environmental water system can provide pure water which is filtered through the ultrafiltration membrane and RO system. Also, a user can operate the TDS controller valve depending on the actual use requirement so as to have different TDS values of water from the water tap.

4 Claims, 3 Drawing Sheets

ENVIRONMENTAL WATER SYSTEM

FIELD OF THE INVENTION

The present invention relates to a water system and more particularly to an environmental water system providing pure water and mixed water with different total dissolved solids (TDS) values.

BACKGROUND OF THE INVENTION

As a result of industrial development, the air, land and water source are excessively polluted. When the waste gas from factories is discharged into air, it will be dispersed and falls down into the land and water source with rain so as to cause more widespread pollution for earth. Moreover, the rain will also wash the dumping of industrial waste into water source area. Although water is adapted to go through the purifying procedures including precipitation, disinfection and exposure after collected, these procedures are still not enough to completely remove all kinds of pollutants. In addition, the chlorine is usually added into tap water during the disinfection process.

Though the permissible mount of chlorine is not harmful to human health, it still makes the tap water smell bad. Furthermore, with the tap water pipes and tanks getting older over time, the tap water can also be contaminated by water equipment. Thus, the tap water for drinking or washing is often passed through a water filter for purification before used, and nowadays reverse osmosis (RO) system is the most popular and common way for water purification, which is adapted to use thin film and reverse osmosis principle to remove ions, molecules and particles from the tap water.

However, the conventional RO system has following disadvantages: (i) the film of conventional RO system is tight, which is adapted to filter out the impurities required for the human body such as minerals, organics, and people may be prone to have osteoporosis and cardiovascular disease when drinking such pure water for a long term; (ii) the filtered water is weakly acidic, which is also not suitable for long-term drinking; and (iii) the use of the conventional RO system is adapted to discharge a large amount of waste water, and the ratio of pure water and waste water even reaches 1:4, which is not environmental friendly. Therefore, there remains a need for a new and improved design for an environmental water system to overcome the problems presented above.

SUMMARY OF THE INVENTION

The present invent provides an environmental water system which comprises an ultrafiltration membrane, a reserves osmosis (RO) system, a waste water tank, a mixer, a total dissolved solids (TDS) controller valve, a connector, and a water tap. The ultrafiltration membrane comprises a water inlet and a water outlet, and the water inlet is connected to a water source. The water source is adapted to flow through the water inlet into the ultrafiltration membrane, and the ultrafiltration membrane is configured to filter the water source and produce filtered water. The water outlet of the ultrafiltration membrane is connected to a first tube body so as to send the filtered water to the RO system and the mixer. The filter fineness of the ultrafiltration membrane is adapted to reach 0.01 μm, which is configured to remove harmful substances in the water source such as rust, bacteria, microbes, virus, heavy metals, colloid, algae, and sediment. The ultrafiltration membrane is configured to retain minerals, organics, and trace elements in the water source, which are needed by human body, so that the filtered water is adapted to have higher TDS value. The RO system is adapted to filter out of the minerals, organics and trace elements from the filtered water so as to produce pure water. The RO system is connected to the TDS controller valve through a second tube body so as to send the pure water to the TDS controller valve. The waste water tank is provided to receive and store waste water from the purification process of the RO system, wherein the waste water comes from the filtered water from the ultrafiltration membrane before processed through RO system, so that the waste water is a kind of water comprising minerals, organics and trace elements and without harmful substances. The mixer has a first tapered section, a throat section and a second tapered section connected in sequence, and the first tapered section has a gradually smaller outer diameter toward the throat section while the second tapered section comprises a gradually larger outer diameter away from the throat section. The first tapered section and the second tapered section respectively and axially penetrate through two ends of the mixer. The first tapered section is connected to the first tube body while the throat section is connected to the waste water tank, and the second tapered section is connected to the TDS controller valve through a third tube body. The negative pressure is generated at the throat section when the filtered water flows from the first tapered section through the second tapered section and the third tube body to the TDS controller valve, and the negative pressure is adapted to pump the waste water in the waste water tank to the mixer. The waste water and the filtered water are mixed in the mixer and flow into the TDS controller valve. The TDS controller valve comprises a first water inlet hole, a second water inlet hole, and a water outlet hole, and the first water inlet hole is connected to the second tube body. The first water inlet hole is communicated with the water outlet hole at initial position, and a fourth tube body is connected between the water outlet hole and the connector so as to send the pure water from the second tube body through the TDS controller valve and fourth tube body to the connector. Through operating the TDS controller valve, the second water inlet hole, which is closed at initial position, is configured to gradually communicate with the water outlet hole, and the second water inlet hole is connected to the third tube body.

A user can operate the TDS controller valve depending on the actual use requirement so as to send the filtered water and the waste water into the fourth tube body and the connector. The filtered water and the waste water are mixed with the pure water in the fourth tube body and the connector to produce mixed water. The TDS controller valve comprises a display unit which is electrically connected to a TDS concentration sensor installed in the connector, and the display unit is adapted to show TDS value in the connector. The water tap has a handle installed thereon to turn on/off the water tap. When the water tap is turned on through the handle, the pure water or the mixed water is adapted to flow through the fourth tube body and the connector out from the water tap.

Comparing with conventional water system, the present invention is advantageous because: (i) at initial position, only the pure water is adapted to pass through the connector, and a user can operate the handle to enable the pure water to flow through the connector and out of the water tap; (ii) a user can also operate the TDS controller valve to enable the filtered water and the waste water to mix with the pure water in the fourth tube body and the connector so as to change TDS value of the water flowing out from the water tap and to have different TDS values of water from the water tap; and (iii) part of the mixed water is from the waste water, which is water-saving and environmental friendly.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
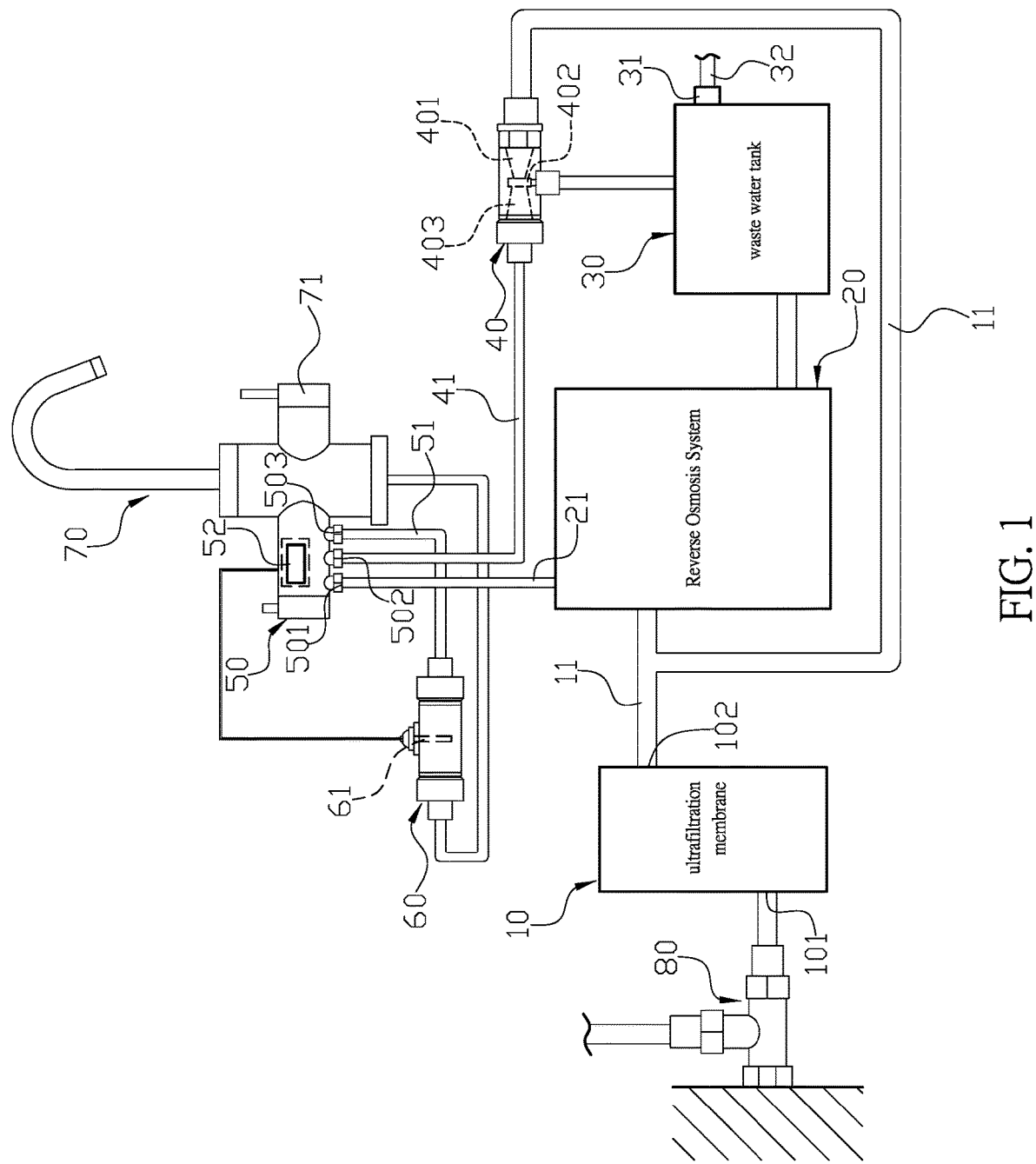
FIG. 1 is a frame diagram of an environmental water system of the present invention.

In order to further understand the goal, characteristics and effect of the present invention, a number of embodiments along with the drawings are illustrated as following:

Referring to FIG. 1, the present invention provides an environmental water system which comprises an ultrafiltration membrane (10), a reserves osmosis (RO) system (20), a waste water tank (30), a mixer (40), a total dissolved solids (TDS) controller valve (50), a connector (60), and a water tap (70). The ultrafiltration membrane (10) comprises a water inlet (101) and a water outlet (102), and the water inlet (101) is connected to a water source (80). The water source (80) is adapted to flow through the water inlet (101) into the ultrafiltration membrane (10), and the ultrafiltration membrane (10) is configured to filter the water source (80) and produce filtered water. Also, the water outlet (102) of the ultrafiltration membrane (10) is connected to a first tube body (11) so as to send the filtered water, which is from the ultrafiltration membrane (10), to the RO system (20) and the mixer (40). The filter fineness of the ultrafiltration membrane (10) is adapted to reach 0.01 μm, which is configured to remove harmful substances in the water source (80) such as rust, bacteria, microbes, virus, heavy metals, colloid, algae, and sediment. Moreover, the ultrafiltration membrane (10) is configured to retain minerals, organics, and trace elements in the water source (80), which are needed by human body, so that the filtered water is adapted to have higher TDS value. The unit of measurement is mg/L, which shows how many milligrams of soluble solids in 1 liter of water.

Since the ultrafiltration membrane (10) is adapted to remove the harmful substances, the higher TDS value means that there are more minerals, organics and trace elements in the water source (80). The RO system (20) is adapted to filter out of the minerals, organics and trace elements from the filtered water so as to produce pure water. The RO system (20) is connected to the TDS controller valve (50) through a second tube body (21) so as to send the pure water to the TDS controller valve (50). The waste water tank (30) is provided to receive and store waste water from the purification process of the RO system (20), wherein the waste water comes from the filtered water from the ultrafiltration membrane (10) before processed through RO system (20), so that the waste water is a kind of water comprising minerals, organics and trace elements and without harmful substances. The mixer (40) has a first tapered section (401), a throat section (402) and a second tapered section (403) connected in sequence, and the first tapered section (401) has a gradually smaller outer diameter toward the throat section (402) while the second tapered section (403) comprises a gradually larger outer diameter away from the throat section (402). Moreover, the first tapered section (401) and the second tapered section (403) respectively and axially penetrate through two ends of the mixer (40). The first tapered section (401) is connected to the first tube body (11) while the throat section (402) is connected to the waste water tank (30), and the second tapered section (403) is connected to the TDS controller valve (50) through a third tube body (41). The negative pressure is generated at the throat section (402) when the filtered water flows from the first tapered section (401) through the second tapered section (403) and the third tube body (41) to the TDS controller valve (50), and the negative pressure is adapted to pump the waste water in the waste water tank (30) to the mixer (40). Thus, the waste water is adapted to mix with the filtered water and flow into the TDS controller valve (50). The TDS controller valve (50) comprises a first water inlet hole (501), a second water inlet hole (502), and a water outlet hole (503), and the first water inlet hole (501) is connected to the second tube body (21). Moreover, the first water inlet hole (501) is communicated with the water outlet hole (503) at initial position, and a fourth tube body (51) is connected between the water outlet hole (503) and the connector (60) so as to send the pure water from the second tube body (21) through the TDS controller valve (50) and fourth tube body (51) to the connector (60).

Through operating the TDS controller valve (50), the second water inlet hole (502), which is closed at initial position, is configured to gradually communicate with the water outlet hole (503), and the second water inlet hole (502) is connected to the third tube body (41). Thus, a user is adapted to operate the TDS controller valve (50) depending on the actual use requirement so as to send a desired amount of the filtered water and the waste water into the fourth tube body (51) and the connector (60). The filtered water and the waste water are mixed with the pure water in the fourth tube body (51) and the connector (60) to produce mixed water. In addition, the TDS controller valve (50) comprises a display unit (52) which is electrically connected to a TDS concentration sensor (61) installed in the connector (60), and the display unit (52) is adapted to show TDS value in the connector (60). The water tap (70) has a handle (71) installed thereon to turn on/off the water tap (70). When the water tap (70) is turned on through the handle (71), the pure water or the mixed water is adapted to flow through the fourth tube body (51) and the connector (60) out from the water tap (70).

In one embodiment, the waste water tank (30) is connected to an overflow pipe (32) through a non-return valve (31) so as to discharge the overflow waste water through the non-return valve (31) and the overflow pipe (32).

In another embodiment, the TDS controller valve (50) is directly installed on the water tap (70).

In still another embodiment, the display unit (52) is a LCD monitor.

Figure 2:
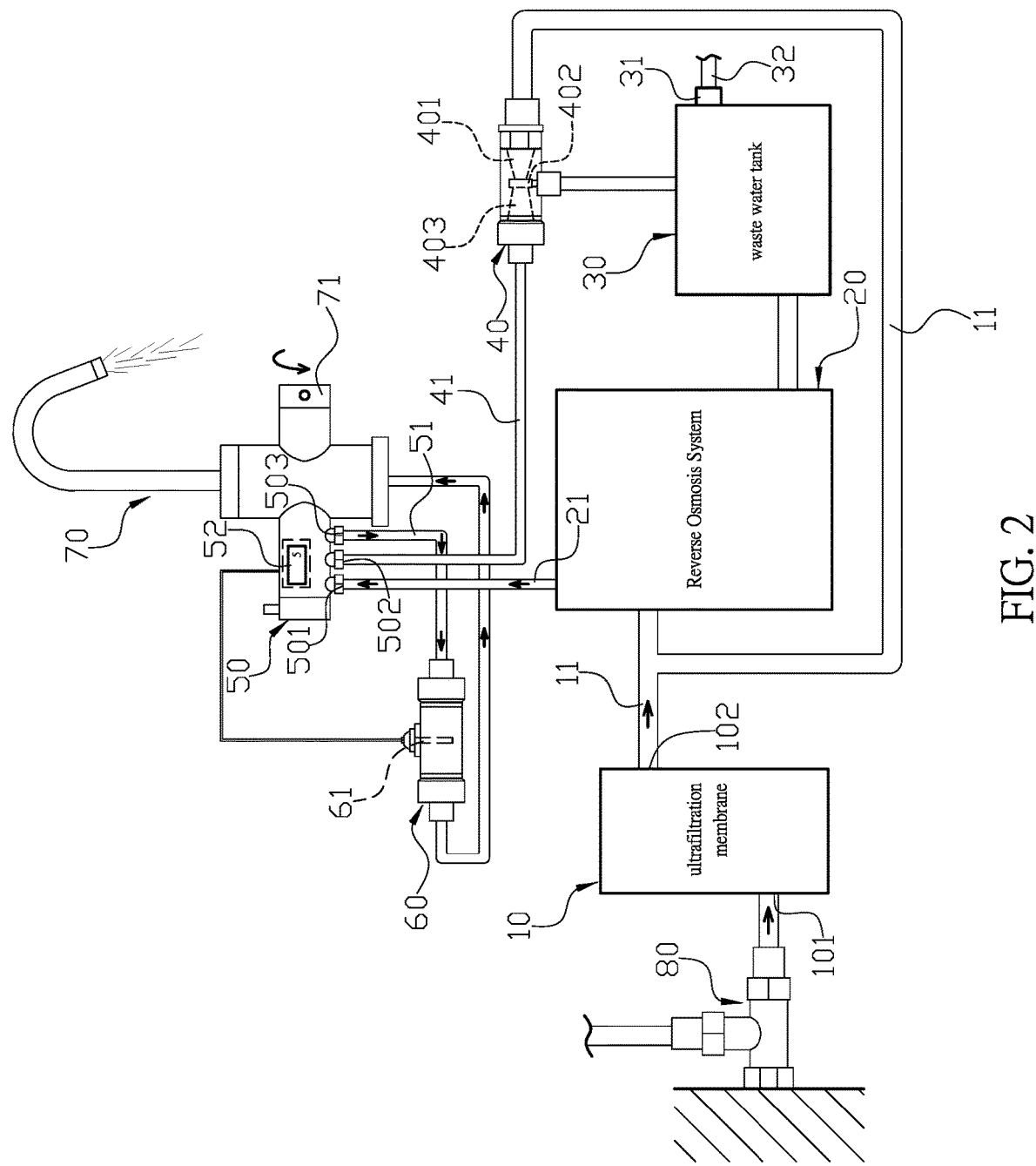
FIG. 2 is a schematic view of the environmental water system of the present invention when the pure water is provided.
Figure 3:
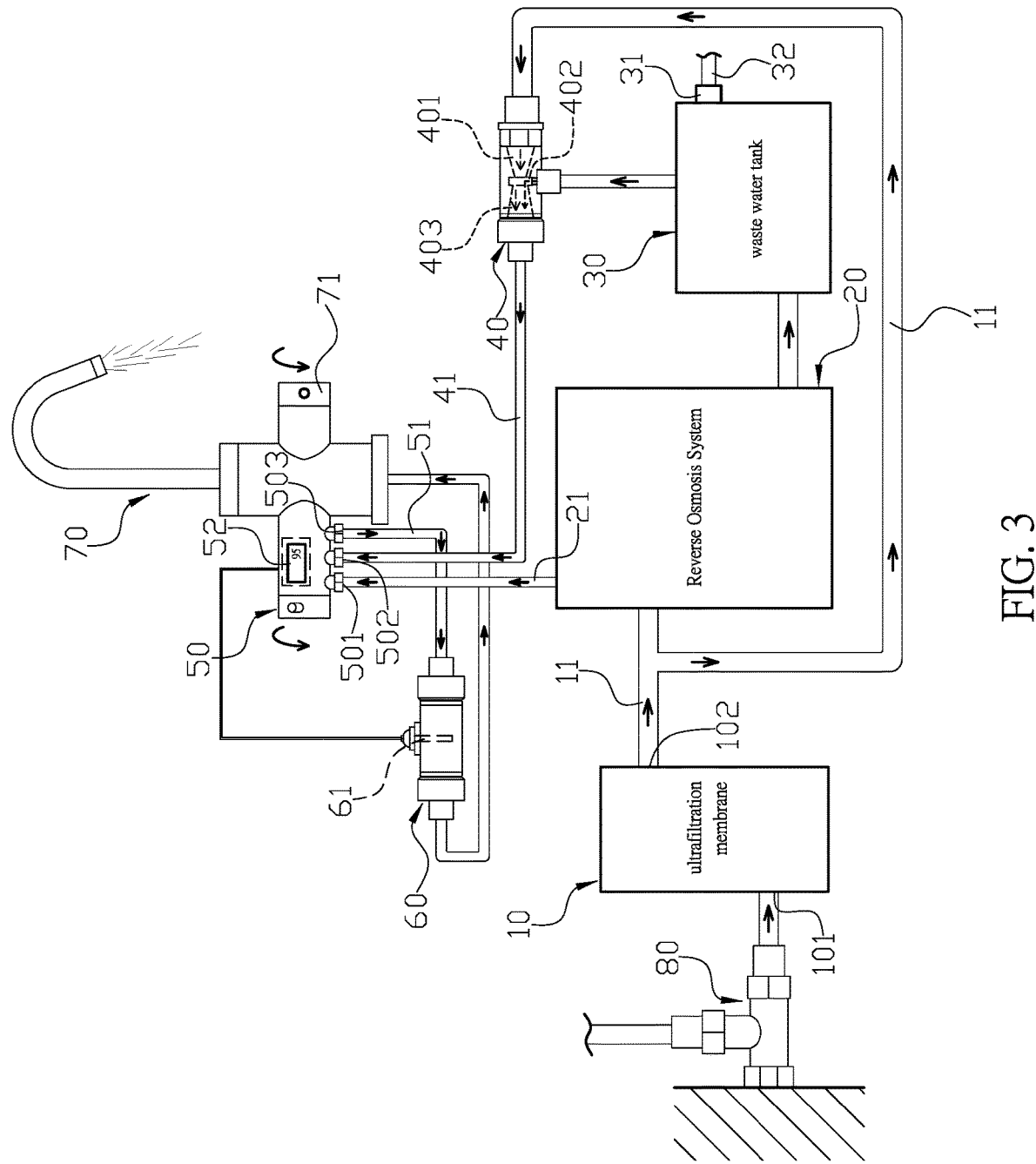
FIG. 3 is a schematic view of the environmental water system of the present invention when the mixed water is provided.

Comparing with conventional water system, the present invention is advantageous because: (i) at initial position, only the pure water is adapted to pass through the connector (60), and a user can operate the handle (71) to enable the pure water to flow through the connector (60) and out of the water tap (70) (as shown in FIG. 2); (ii) a user can also operate the TDS controller valve (50) to enable the filtered water and the waste water to mix with the pure water in the fourth tube body (51) and the connector (60) so as to change TDS value of the water flowing out from the water tap (70) (as shown in FIG. 3) and to have different TDS values of water from the water tap (70); and (iii) part of the mixed water is from the waste water, which is water-saving and environmental friendly.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. An environmental water system comprising an ultrafiltration membrane, a reserve osmosis (RO) system, a waste water tank, a mixer, a total dissolved solids (TDS) controller valve, a connector, and a water tap;
   wherein the ultrafiltration membrane comprises a water inlet and a water outlet, and the water inlet is connected to a water source; the water source is adapted to flow through the water inlet into the ultrafiltration membrane, and the ultrafiltration membrane is configured to filter the water source and produce filtered water; the water outlet of the ultrafiltration membrane is connected to a first tube body so as to send the filtered water to the RO system and the mixer;
   the filter fineness of the ultrafiltration membrane is adapted to reach 0.01 µm, which is small enough to remove harmful substances from the water source including rust, bacteria, microbes, virus, heavy metals, colloid, algae, and sediment; the ultrafiltration membrane is configured to allow to pass through minerals, organics, and trace elements in the water source, so that the filtered water is adapted to have higher TDS value than pure water produced in a purification process of the RO system;
   wherein the RO system is adapted to filter out the minerals, organics and trace elements from the filtered water so as to produce pure water; the RO system is connected to the TDS controller valve through a second tube body so as to send the pure water to the TDS controller valve;
   wherein the waste water tank is provided to receive and store waste water from a purification process of the RO system, wherein the waste water retains the minerals, organics and trace elements;
   wherein the mixer has a first tapered section, a throat section and a second tapered section connected in sequence, and the first tapered section has a gradually smaller outer diameter toward the throat section while the second tapered section comprises a gradually larger outer diameter away from the throat section; the first tapered section and the second tapered section respectively and axially penetrate through two ends of the mixer; the first tapered section is connected to the first tube body while the throat section is connected to the waste water tank, and the second tapered section is connected to the TDS controller valve through a third tube body; a negative pressure is generated at the throat section when the filtered water flows from the first tapered section through the second tapered section and the third tube body to the TDS controller valve, and the negative pressure is adapted to pump the waste water in the waste water tank to the mixer; the waste water and the filtered water from the UF membrane are mixed in the mixer and flow into the TDS controller valve;
   wherein the TDS controller valve comprises a first water inlet hole, a second water inlet hole, and a water outlet hole, and the first water inlet hole is connected to the second tube body; the first water inlet hole is communicated with the water outlet hole in an initial position, and a fourth tube body is connected between the water outlet hole and the connector so as to send the pure water from the second tube body through the TDS controller valve and the fourth tube body to the connector; through operating the TDS controller valve, the second water inlet hole, which is closed at the initial position, is configured to gradually communicate with the water outlet hole, and the second water inlet hole is connected to the third tube body; a user is adapted to operate the TDS controller valve depending on the actual use requirement so as to send the filtered water and the waste water into the fourth tube body and the connector, and the filtered water and the waste water are mixed with the pure water in the fourth tube body and the connector to produce mixed water; the TDS controller valve comprises a display unit which is electrically connected to a TDS concentration sensor installed in the connector, and the display unit is adapted to show TDS value in the connector; and
   wherein the water tap has a handle installed thereon to turn on/off the water tap; when the water tap is turned on through the handle, the pure water or the mixed water is adapted to flow through the fourth tube body and the connector out from the water tap.

2. The environmental water system of claim 1, wherein the waste water tank is connected to an overflow pipe through a non-return valve so as to discharge overflow waste water.

3. The environmental water system of claim 1, wherein the TDS controller valve is directly installed on the water tap.

4. The environmental water system of claim 1, wherein the display unit is a LCD monitor.

* * * * *